United States Patent Office 2,938,796
Patented May 31, 1960

2,938,796

GROUND MEAT PRODUCT AND METHOD OF PRODUCING SAME

William J. Zick, Crete, Ill., assignor to B. Heller & Company, a corporation of Illinois No Drawing. Filed Feb. 4, 1957, Ser. No. 637,877

17 Claims. (Cl. 99—109)

This invention relates to ground meat products containing a citrus peel meal conditioner and to the method of making the same.

In accordance with the invention, ground citrus peel meal is added to a ground meat product such as sausage meat, as a binder and a conditioner for the meat product. The ground citrus peel meal is freed from the oils naturally present therein, this being accomplished as a step in the process of forming the meal. By incorporating the citrus peel meal in the ground meat product it is possible to use a smaller amount of binder for the ground meat product than heretofore, to impart to the meat product the ability to absorb substantial quantities of moisture while improving the flavor and juiciness of the meat product, particularly after it has been stored.

The present invention is based upon the discovery that the ground dried citrus peels from which the oils have been removed possess excellent water absorbing properties which are maintained at elevated temperature, during and after cooking. The ground citrus peels may be either lemon, lime, tangerine, orange or grapefruit and are termed lemon peel meal, lime peel meal, tangerine peel meal, orange peel meal and grapefruit peel meal, respectively. Surprisingly, the ground dried citrus peels have been found to possess greater water absorbing properties than cereal flours such as wheat flour, corn flour, oat flour, rye flour, rice flour and soya flour, and do not possess the disadvantages of such cereal conditioners.

Prepared ground meat products such as sausages, frankfurters, encased meats, meat loaves, meat patties, canned luncheon meats, and the like have been heretofore made from ground meat, curing agents, flavoring materials and colloidal water-binding agents. The colloidal water-binding agents function primarily to store water in the product in a form not readily lost by evaporation and serve additionally as emulsifiers for fat therein to give smoothness to the product. This is particularly important to minimize shrinkage in ground meat products which may result from drying.

The cereal conditioners for ground meat products may be selected from the cereal flours such as corn flour, wheat flour and soya flour; the gums such as karaya, tragacanth and locust beans; and other materials such as milk solids, agar agar, algin and alginate salts. These prior art conditioners tend to gel as temperatures are lowered and concentrations increased, and to cause undesirable variations in the desired properties of the ground meat product.

Most of the cooked ground meat products must be heated to at least 155° F. in cooking or smoking. This is true of sausage, of loaf, of encased products and of canned products. This heating tends to denature the cereal conditioners. Heating of these prior art cereal conditioners not infrequently brings about a decrease in the water-binding power of the conditioner and a consequent release of the water. This results in a soft, watery ground meat product. Due to the loss of the released water as by evaporation, there is shrinkage. Also, as the meat products age, the cereal conditioners in their gel form also age and in aging lose water-binding power which is manifested by further shrinkage, accompanied by further loss of water through evaporation.

Citrus peel meal resists such decrease in water-binding power at elevated temperatures and maintains a high binding capacity on aging. A further advantage of the ground citrus peel meal over the prior art binders such as cereal flours is that it requires less citrus peel meal to hold any given amount of moisture and meat juices. This means less citrus peel meal is used than in the case of conventional binders in the finished product, and as a result a more flavorful sausage or loaf is produced.

One component which is removed from the citrus peel meal before use in accordance with the invention is the oil because of its taste. There also may be removed from the citrus peel meal used in accordance with the invention all, or substantially all, of the pectin and of the protopectin. The meal is suitable even if it contains some or all of the pectin and/or protopectin present in the original peel.

A preferred dried citrus peel meal used in accordance with the invention contains hemicellulose and protopectins, but no soluble pectins. A typical proximate analysis of an oil-free lemon peel meal in accordance with the invention is as follows:

| | Percent |
|---|---|
| Ash | 3–4 |
| Hemicellulose | 30–35 |
| Protopectin (non-soluble pectin) | 18–22 |
| Other materials | 8 |
| Moisture | Balance |

The protopectin which is present in untreated citrus peel meal is to be distinguished from other pectin bodies such as pectin or pectic acid. In contrast to the high solubility and active reversible jellying action of pectin and pectic acid, protopectin is insoluble and usually requires severe conditions of temperature and pressure in the presence of hydrolyzing agents to cause its breakdown into soluble substances.

Hemicellulose dissolves in water with difficulty, if it dissolves at all, and also is resistant to hydrolysis. In contrast to colloidal jellies, such as pectin, which dissolve freely in water and are known to have a high binding power, the principal constituents of the citrus peel meal, on the basis of their composition, would be expected to be without value as a replacement for the cereal flours, agar agar, and like colloidal conditioners of the prior art.

In producing sausages the conventional procedure is followed. Ground meat and meat trimmings, which may be either raw or cured, together with citrus peel meal, added curing salt and the seasoning (usually consisting of or comprising spices, peppers, spice essence, spice oils, and/or oleoresins of peppers) are blended in a suitable chopper. Ice is usually added. The total chopped ice weight may be equal to from about 20% to as much as 100% of the weight of the meat.

As the ice melts, it lowers the temperature of the chopped mixture to minimize and prevent bacterial growth. The ice water is largely absorbed by the comminuted meat. It washes the added salt and seasoning into the meat mixture. The salt and seasoning appears to be more uniformly bound to the product containing the citrus peel meal than in the case if the citrus peel meal is omitted.

In the smoke house the sausages usually attain temperatures varying from about 135° F. to 155° F. They usually remain in the smoke house from one to eight hours, depending upon the temperature of the sausages, their variety and the degree of smoking desired. In the smoke house and while the smoke is being absorbed through the pores of the casings, there occur natural phenomena of liquefaction with cereal conditioners which usually tend to effect an undesirable ultimate appearance, structure and quality of the sausages.

If the cereal conditioner becomes too liquid at the smoking temperatures, the casing contents increase in volume. This objectionable result is obviated by the use of citrus peel meal in accordance with the invention. The citrus peel particles remain firm and contribute an excellent binding action while retaining the meat product in juicy, well seasoned condition. Ordinarily, the casing contents release free moisture and some of the moisture turns to vapor. The pores of the casings tend to expand, with a resultant stretching or leakage of liquid and vapor from the casings, but this is minimized by the use of citrus peel meal.

As a result of the phenomena discussed, processed sausages produced by conventional procedures tend to dry out quickly even though cereal moisture conditioning agents are employed. By the use of oil-free citrus peel meal, in accordance with the invention, a small quantity of the citrus peel meal conditioning agent is effective. Further, the product may be stored for a longer period of storage while maintaining the quality, than the product made with the conventional cereal conditioning agents.

The amount of ground citrus peel meal employed to condition the ground meat product may vary widely, depending upon the nature of the product, the condition in which it is stored, and the procedure utilized in its preparation. A sausage preparation such as bologna or frankfurters may be beneficially conditioned with as little as about 1% of citrus peel meal by weight of the mixture, for example, ground citrus peel meal. Generally, however, it is desirable to use at least about 3% to 4% of the ground citrus peel meal. Larger amounts up to about 15%–20% by weight may be employed without impairing the flavor and juiciness of the sausage product, but the use of still larger amounts may not be desired if the meat content is to be kept at a maximum. Absent such restriction the larger quantities of citrus peel meal employed have the favorable characteristics of the optimum proportions just mentioned.

It is frequently advantageous to blend the citrus peel meal addition with the seasoning in order to promote uniform distribution of seasoning and conditioner in the ground meat product. For highly seasoned products where careful balance must be maintained to receive the desired blend of flavors for satisfying a discriminating palate, it is possible to achieve better seasoning control in a shorter mixing time to provide a superior flavored meat product by pre-blending the citrus peel meal conditioner and the seasoning. The seasoning appears to be tightly bound to the citrus peel meal and is released to the meat and meat juices at a slow rate. This permits expert and close control of seasoning additioning to adjust flavor and taste. At the same time the pre-seasoned meal is stable in storage and easily handled during the preparation of the meat product.

In a packed ground meat formula such as chili con carne, canned luncheon meat, canned dog food, etc., the requirement need not be met that the citrus peel meal, such as lemon peel meal, orange peel meal, grapefruit peel meal, or tangerine peel meal, be kept below a minimum value as in the case of an all meat sausage product. Accordingly, from about 1% up to about 25% or more may be used of these citrus peel meal conditioning materials.

With prepared ground meat sausage mixtures of the non-all-meat type, such as pickle and pimento loaf, the amount of citrus peel meal generally employed is at least about 1% and preferably about 8% to 15% of the total weight of the finished sausage. This amount may be as high as about 25%–30%. Generally, lesser amounts (8%–10%) are employed as the meat content is higher in the product.

Desirable results are obtained in conditioning fresh, uncooked, ground meats such as beef, pork, lamb and veal, or combinations of these in bulk, in patty or in loaf form. These preparations, sold commercially in prepared form for cooking in the home, including items such as pork and veal patties, pork sausage and the like, may be stored in refrigerated counters for long periods without shrinking, while retaining the meat juices and added moisture therein. The beneficial conditioning of the meat product is maintained during the cooking procedure carried out by the housewife in the home.

The use of these ground dried citrus peel meals produces sausages and loaves which have retained the natural meat juices resulting in maximum flavor and juiciness. The sausage and loaves slice without crumbling and retain their plumpness on storage while on the way to market.

The following examples are given by way of illustration and not by way of limitation. All parts and percentages are by weight.

*Example I*

A typical cooked frankfurter or bologna sausage formula using ground dried citrus peels is as follows:

150 lbs. beef
400 lbs. pork
18 lbs. lemon peel meal
14 lbs. salt
5 lbs. seasoning
1 lb. 6 oz. curing salt
125 lbs. crushed ice The beef is ground through a 1/8 inch plate and the pork trimmings are ground through a 3/16 inch plate. The ground beef is seasoned in a cutter with salt, curing salt, and seasoning and then chopped, adding 20 pounds of ice until the ice is absorbed. The remainder of the ice is added and the mixture is chopped until the temperature reaches 35° F. The lemon peel meal is added and chopped to 45° F. and the pork is added and chopped. The chopper is operated to reduce the mixture to particles of the requisite size for completing intermixture of the chopper contents.

The chopped solid material containing entrained moisture, is then stuffed into suitable casings, i.e., either natural gut casings or artificial casings. These casings are more or less porous in order that their contents be properly cured by the smoking operation which is next performed.

The sausage is dried and is placed in the smoke house at 135° F., without smoke for 30 minutes. Then, with smoke, the temperature is raised to 150° F. and held for 30 minutes. The temperature is then raised to 165° F. and held for 30 minutes, and at 175° F. for an added 30 minutes, or until the internal temperature of the sausage is about 142°–144° F.

The processed sausages, e.g., frankfurters, bologna, are now cooked at temperatures varying from 155° F. to 175° F. for about 10 minutes.

*Example II*

A typical pickle and pimento loaf formula using ground dried citrus peels is as follows:

60 lbs. veal
40 lbs. pork, 50% lean
10 lbs. lemon peel meal
25 lbs. crushed ice
2 lbs. salt
8 oz. sugar
8 oz. seasoning
4 oz. curing salt
4 lbs. diced sweet peppers (red)
4 lbs. pickle relish In the foregoing example, the veal trimmings and pork trimmings are cut in the same manner as in Example I in order to grind them to the proper consistency for making the loaf. Crushed ice is added to the veal trimmings and to the pork trimmings and each is separately seasoned in accordance with the same procedure as in Example I.

The lemon peel meal is blended with the seasoning, sugar and curing salt during the chopping operation. Chopping is completed when the mixture is fine and uniform.

The sweet diced peppers and pickle relish are blended into the chopper emulsion and worked into baking pans, care being taken to avoid air pockets from forming.

The loaves are then baked in an oven under gradually increasing temperature which is raised from 125° F. to 275° F., for a period of about 4 hours. The internal temperature of the loaf is held at about 150° F.–155° F. for a period of about 10–15 minutes at the end of the baking cycle, after which the loaves are permitted to cool gradually and are subsequently moved to refrigeration storage. The product may be dipped into gelatin and stuffed into castings.

*Example III*

A typical chili con carne formula using ground dried citrus peels is as follows:

315 lbs. beef trim
100 lbs. beef fat
40 lbs. onions
35 lbs. orange peel meal
31 lbs. tomato puree
55 lbs. seasoning
10 lbs. salt
5 oz. garlic powder
195 lbs. tap water The beef trimmings and fat are ground as in Example I, mixed with the orange peel meal and water, and put into cans which are cooked in a retort at 240° F. for 90 minutes, after which cooking they are cooled and sent to storage or delivery platforms.

The amount of hemicellulose and protopectin in the oil-free citrus peel meal may vary widely. As little as 1%–2% of the protopectin may be present with good results, which indicates that the hemicellulose is a principal factor in providing the water binding function. The amount of protopectin in the meal may be much higher than the amount of hemicellulose present and good results are also obtained. It appears that the colloidal character of the naturally occurring citrus peel meal provides these hemicellulose and/or protopectin constituents in a desirable water-binding form after processing to remove the oil therefrom and after comminution. The desirable conditioning function for ground meats is thus obtained even though these constituents of the meal may vary widely in their proportions as a result of variations due to natural origin or due to processing.

I claim:

1. A moist ground meat product for cooking containing between about 1% and about 20% by weight thereof of oil-free, citrus peel meal dispersed therethrough.

2. A sausage product containing moisture and from about 3–20% by weight thereof of oil-free, citrus peel meal dispersed therethrough.

3. A moist ground meat product for cooking containing from about 3–20% by weight thereof of oil-free, citrus peel meal dispersed therethrough, said peel meal containing hemicellulose and protopectin.

4. The method of preparing ground meat products for cooking having enhanced moisture retention comprising adding to a ground meat product between about 1% and about 20% by weight of said product of oil-free, citrus peel meal and mixing said meal with said ground meat to provide uniform distribution of said meal with said ground meat product.

5. A method as recited in claim 4 wherein said citrus peel meal is oil-free, dried lemon peel meal.

6. A method as recited in claim 4 wherein said citrus peel meal is oil-free, dried orange peel meal.

7. A method as recited in claim 4 wherein said citrus peel meal is oil-free, dried lime peel meal.

8. A method as recited in claim 4 wherein said citrus peel meal is oil-free, dried tangerine peel meal.

9. A method as recited in claim 4 wherein said citrus peel meal is oil-free, dried grapefruit peel meal.

10. The method of preparing cooked ground meat products having enhanced moisture retention comprising adding to a ground meat product an amount of from about 3–15% by weight of said product of oil-free, citrus peel meal and mixing said meal with said ground meat to provide uniform distribution of said meal with said ground meat product.

11. The method of preparing sausage products having enhanced moisture retention comprising adding to a ground meat sausage product an amount of about 3–20% by weight of said product of oil-free, citrus peel meal and mixing said meal with said ground meat sausage product to provide uniform distribution of said meal with said ground meat sausage product.

12. The method of preparing cooked canned ground meat products having enhanced moisture retention comprising adding to a canned ground meat product an amount of about 3–15% by weight of said product of oil-free, citrus peel meal and mixing said meal with said canned ground meat product to provide uniform distribution of said meal with said canned ground meat product.

13. The method of preparing cooked ground meat products having enhanced moisture retention comprising adding to a ground meat product between about 1% and about 20% by weight of said product of oil-free, citrus peel meal and mixing said meal with said ground meat to provide uniform distribution of said meal with said ground meat product and cooking said mixture.

14. The improvement in the art of making sausage which consists of introducing in the sausage casing contents between about 3% and about 20% oil-free, citrus peel meal, said amount of meal being sufficient to bind moisture in the said contents and from the casing during slow processing and to jell the free moisture residual in the casing when the sausage is cooled.

15. The improvement in the art of making sausage which consists of introducing in the sausage casing contents a quantity of oil-free, citrus peel meal in admixture with seasoning which is bound to said meal, the amount of said meal being between about 3% and about 20% and sufficient to bind moisture in the said contents and from the casing during slow processing and to jell the free moisture residual in the casing when the sausage is cooled.

16. The method of preparing ground meat products having enhanced moisture retention comprising adding to a ground meat product between about 1% and about 20% by weight of said product of oil-free, citrus peel meal, said citrus peel meal containing hemicellulose effective as a conditioning agent for said ground meat product and mixing said meal with said ground meat to provide uniform distribution of said meal with said ground meat product.

17. The method of preparing ground meat products having enhanced moisture retention comprising adding to a ground meat product between about 1% and about 20% by weight of said product of oil-free, citrus peel meal, said citrus peel meal containing hemicellulose and protopectin which are effective to condition said ground meat product and mixing said meal with said ground meat to provide uniform distribution of said meal with said ground meat product.

References Cited in the file of this patent

UNITED STATES PATENTS

| | | |
|---|---|---|
| 2,355,548 | Musher | Aug. 8, 1944 |
| 2,596,662 | Ducker et al. | May 13, 1952 |
| 2,634,211 | Komarik | Apr. 7, 1953 |
| 2,635,963 | Glabe | Apr. 21, 1953 |